(12) United States Patent
Chu

(10) Patent No.: US 7,341,223 B2
(45) Date of Patent: Mar. 11, 2008

(54) HYBRID UNMANNED VEHICLE FOR HIGH ALTITUDE OPERATIONS

(75) Inventor: Adam Ning Chu, Colorado Springs, CO (US)

(73) Assignee: Multimax, Inc., Largo, MD (US)

(*) Notice: Subject to any disclaimer, the term of this patent is extended or adjusted under 35 U.S.C. 154(b) by 18 days.

(21) Appl. No.: 11/334,581

(22) Filed: Jan. 18, 2006

(65) Prior Publication Data

US 2006/0284003 A1    Dec. 21, 2006

Related U.S. Application Data

(60) Provisional application No. 60/644,608, filed on Jan. 18, 2005.

(51) Int. Cl.
*B64B 1/06* (2006.01)

(52) U.S. Cl. .......................................... 244/24; 244/25

(58) Field of Classification Search .................. 244/24, 244/25, 30, 31, 125, 126, 127, 5, 96, 97, 244/98, 99
See application file for complete search history.

(56) References Cited

U.S. PATENT DOCUMENTS

| | | | |
|---|---|---|---|
| 1,569,161 A | | 1/1926 | Valkenberg |
| 3,223,360 A * | | 12/1965 | Hertel et al. .............. 244/23 D |
| 3,971,533 A | | 7/1976 | Slater |
| 4,085,912 A * | | 4/1978 | Slater .......................... 244/25 |
| 4,534,525 A | | 8/1985 | Bliamptis |
| 5,518,205 A * | | 5/1996 | Wurst et al. ................... 244/58 |
| 5,906,335 A | | 5/1999 | Thompson |
| 6,305,641 B1 | | 10/2001 | Onda et al. |
| 6,568,631 B1 * | | 5/2003 | Hillsdon ....................... 244/30 |
| 6,581,873 B2 * | | 6/2003 | McDermott .................. 244/25 |

(Continued)

FOREIGN PATENT DOCUMENTS

EP    0312075    4/1989

(Continued)

OTHER PUBLICATIONS

International Search Report and Written Opinion, Jun. 7, 2006

*Primary Examiner*—Michael J. Carone
*Assistant Examiner*—Benjamin P Lee
(74) *Attorney, Agent, or Firm*—Wilmer Cutler Pickering Hale and Dorr, LLP

(57) ABSTRACT

A hybrid aerial vehicle is optimized, for example, and not by way of limitation, to operate above 100,000 feet in altitude and provide persistent and maneuverable flight while carrying a wide array of communications and sensing payloads. The hybrid vehicle may use the high altitude winds to gain altitude by pitching up with the center of gravity (CG) control and using its propulsion drive to thrust into the wind to create aerodynamic lift to rise above the neutral buoyancy altitude. The hybrid vehicle will pitch down with the CG control so as to use gravity and propulsion to accelerate. Yaw control directs the flight towards any compass direction by rotating the gondola. This maneuvering capability permits the vehicle to station operate persistently, even in high winds. The lighter-than-air inflatable saucer shape is optimized for maintaining an aerodynamic cross-section to the prevailing wind from any direction in the vehicle horizontal plane. A gondola below the saucer contains a motor, batteries, solar collector, sensors, and yaw and CG control mechanisms.

38 Claims, 2 Drawing Sheets

U.S. PATENT DOCUMENTS

| | | |
|---|---|---|
| 7,036,768 B2 * | 5/2006 | Bundo .......................... 244/5 |
| 7,093,789 B2 * | 8/2006 | Barocela et al. ............. 244/30 |
| 2002/0134884 A1 * | 9/2002 | Perry et al. .................. 244/24 |
| 2005/0151006 A1 * | 7/2005 | Krill et al. ................... 244/30 |
| 2005/0263642 A1 * | 12/2005 | Geery ......................... 244/30 |
| 2005/0269441 A1 * | 12/2005 | Barocela et al. ............. 244/25 |
| 2006/0060695 A1 * | 3/2006 | Walden et al. ............... 244/24 |
| 2006/0091256 A1 * | 5/2006 | Palmer ........................ 244/97 |

FOREIGN PATENT DOCUMENTS

| | | |
|---|---|---|
| FR | 2681307 | 3/1993 |
| FR | 2803272 | 7/2001 |

* cited by examiner

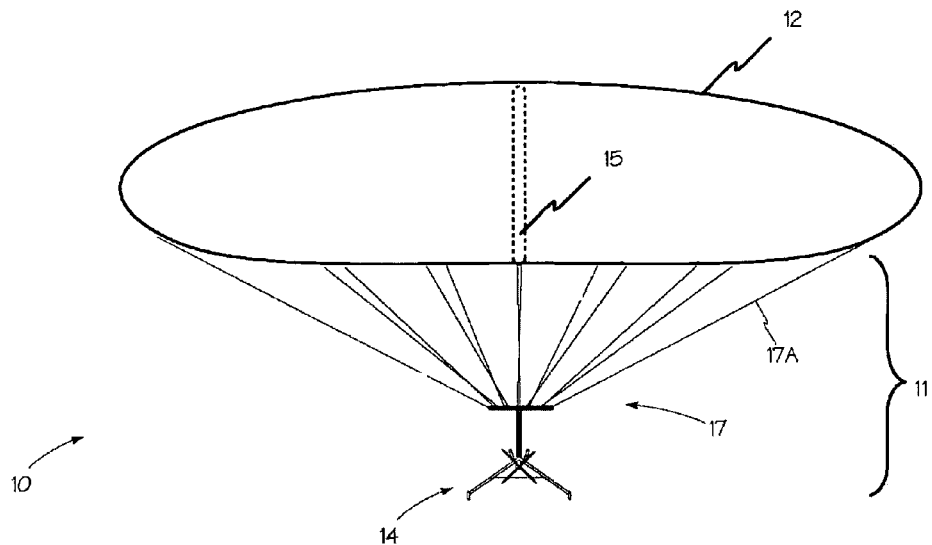
Fig. 1
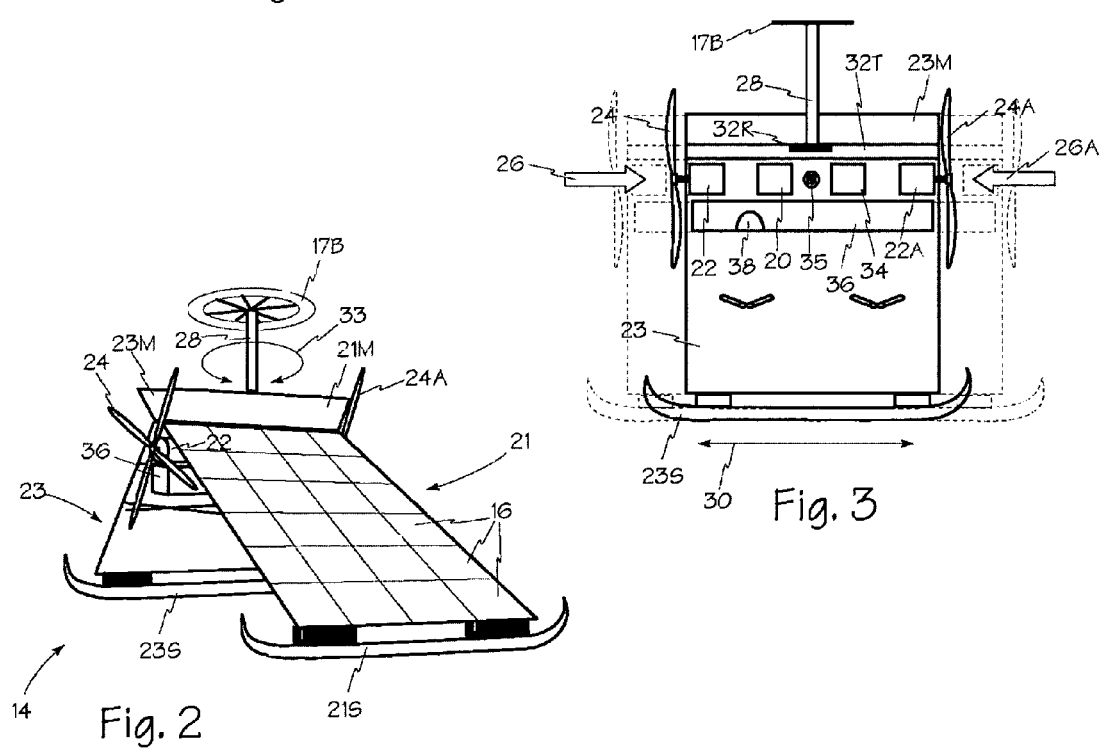
Fig. 2
Fig. 3

HYBRID UNMANNED VEHICLE FOR HIGH ALTITUDE OPERATIONS

CROSS-REFERENCE TO RELATED APPLICATIONS

This is a non-provisional application based on and claiming the priority filing date of co-pending U.S. provisional patent application Ser. No. 60/644,608, filed Jan. 18, 2005.

BACKGROUND OF THE INVENTION

1. Field of the Invention

The invention relates to unmanned aerial vehicles, and more specifically to hybrid lighter-than-air vehicles for persistent, high altitude maneuvering and station keeping.

2. Description of the Prior Art

The United States federal agencies and commercial organizations are dependent on satellites for providing communications, imagery, sensing, and navigation for domestic, theater and global operations. Conventional GEO-synchronous satellites cannot provide high resolution imagery and high-fidelity sensing. Though higher resolution imagery and sensing is available from medium and low-earth orbit satellites, these orbits require large constellations of satellites to provide timely coverage over any given geographical region due to orbit inclinations and revisit times.

Balloon payloads have become more capable in recent years because the cost, size and weight of electronics and high-end processors have dramatically decreased. Over any geographical region, a low-cost balloon hoisted system can provide full coverage, 24 hours a day. However, free floating balloons have no means of maneuvering; they may have some limited active buoyancy control, but remain subject to prevailing wind and will float downwind. Because of atmospheric winds, numerous balloons must be continuously launched in order to provide the continuous coverage over any geographical area. Due to lack of maneuvering, balloons and payloads are difficult to recover.

Unmanned winged aircraft of various configurations are also being used with some drawbacks, such as the time on station limited by fuel and large and expensive logistical requirements to support the aircraft. High altitudes that protect the aircraft from threats and provide greater payload coverage are also difficult to achieve and maintain because of aerodynamic limits of fixed wing aircraft.

What is needed is a hybrid aircraft combining the efficiencies, operating altitudes, and durability of balloons with the station keeping maneuverability of winged aircraft.

SUMMARY OF THE INVENTION

A hybrid aerial vehicle according to the present disclosure may be optimized, for example to operate above 100,000 feet in altitude and provide persistent and maneuverable flight while carrying a wide array of communications and sensing payloads. The hybrid vehicle may use the high altitude winds to gain altitude by pitching up with the center of gravity (CG) control and using its propulsion drive to thrust into the wind to create aerodynamic lift to rise above the neutral buoyancy altitude. The hybrid vehicle will pitch down with the CG control so as to use gravity and propulsion to accelerate. Yaw control directs the flight towards any compass direction by rotating the gondola. This maneuvering capability permits the vehicle to station operate persistently, even in high winds. The lighter-than-air inflatable saucer shape is optimized for maintaining an aerodynamic cross-section to the prevailing wind from any direction in the vehicle horizontal plane. A gondola below the saucer contains a motor, batteries, solar collector, sensors, and yaw and CG control mechanisms In a first aspect, a hybrid aerial vehicle according to one preferred embodiment provides a lighter-than-air, maneuverable vehicle designed to achieve persistence and loitering over a geographical area at altitudes above 100,000 feet. The hybrid aerial vehicle is a maneuverable, high altitude, lighter-than-air vehicle capable of providing persistent, long duration payload coverage over a large geographical area, even in the presence of high altitude winds.

In another aspect of the present disclosure, a hybrid aerial vehicle includes a lighter-than-air gas (hydrogen or helium) filled vehicle having an envelope shaped to provide aerodynamic lift. The vehicle employs propelled flight and a unique flight control system necessary for high altitude maneuvering. In one embodiment, the vehicle can climb and dive into prevailing winds to gain energy and accelerate, allowing the vehicle to maintain fixed point or course station-keeping for the duration of flight. In one embodiment, the hybrid aerial vehicle is powered by solar energy collected from high efficiency, multi-junction solar cells located on the vehicle's solar wings, and stored in onboard batteries to power vehicle systems both day and night. These systems include propulsion, electrical, aerodynamic controls, communications, payloads and precision recovery. According to one embodiment, the hybrid aerial vehicle is able to fly to, and maintain a prescribed station-keeping profile over, a large geographical area for many weeks. At the end of its time on-station, the vehicle is able to fly to, and land at various locations in a downwind direction selected for the operational situation, and specific season and time of year. The precision recovery system allows recovery of the vehicle and payload at a specific geographical location best suited for the operations supported.

In another aspect, the hybrid aerial vehicle is designed for remote operations allowing for greater utility to support a variety of users. The vehicle is designed to be stored in transportable lightweight containers, and assembled and launched from locations anywhere in the world.

In yet another aspect, the vehicle employs fixed wing flight principles such as aerodynamic lift, drag, and thrust, combined with lighter-than air principles, to enable maneuverable flight operations in 100,000 feet plus altitude environment. A flight profile is enabled by center of gravity (CG) and yaw control functions that provide pitch, angle of attack and directional changes of the hybrid vehicle's flight. The combination of employing these fixed wing capabilities with lighter-than-air capabilities allows the vehicle to gain altitude above neutral buoyancy. The altitude gained above neutral buoyancy is then used as energy to accelerate the vehicle in a descent maneuver to speeds greater than the prevailing winds. This maneuverability combined with propulsion enables a hybrid aerial vehicle according to the present disclosure to use prevailing wind to gain altitude (potential energy), and then dive (kinetic energy) into the wind to recover ground distance.

In still another aspect, a hybrid vehicle according to the present disclosure may also include onboard expendable liquid hydrogen or helium providing the ability to add gas in volumetric units, if needed, over the duration of flight. The vehicle in this embodiment also employs an automatic gas vent control to prevent an overpressurization of the envelope in any condition, such as ascent, filling, thermal expansion or replenishment. The vehicle uses the combination of propulsion, balloon shape, CG and yaw controls, helium augmentation/venting, flight profile to permit persistence, maneuverability, and loitering, in high altitude flight while carrying a range of payloads. The launch and recovery operations enable the vehicle to be employed world wide in a wide range of applications.

In yet another aspect, the vehicle is optimized to work within the high wind fields above 100,000 feet. In addition to the lift provided by the lighter-than-air gas, the aerodynamic shape of the balloon provides lift when propelled forward. By shifting the weight of the gondola underneath the envelope, the angle of attack can be changed of the disclosed vehicle. When the weight of the gondola is moved aft, the aerial vehicle's angle of attack increases. The propulsion motors and propellers thrust the vehicle forward with a positive angle of attack, creating the additional lift needed to climb the vehicle above neutral buoyancy. At the appropriate time, the CG control shifts the weight of the gondola forward resulting in a negative angle of attack of the aerial vehicle. The aerial vehicle then thrusts forward with the combined effects of the vehicle propulsion system, gravity, and the energy gained from the climb. This diving acceleration maneuver is executed in the direction of intended flight, established by the rotator control. The inflatable saucer shape is optimum for maintaining an aerodynamic cross-section to the prevailing wind from any direction in the vehicle horizontal plane. A gondola below the saucer contains the motors, propellers, batteries, solar collector, sensors, yaw and center-of-gravity (CG) control mechanisms.

These and other features and advantages of this disclosure will become further apparent from the detailed description and accompanying figures that follow. In the figures and description, numerals indicate the various features of the disclosure, like numerals referring to like features throughout both the drawings and the description.

BRIEF DESCRIPTION OF THE DRAWINGS

FIG. 1 is a front view of a hybrid aerial vehicle according to the present disclosure.

FIG. 2 is a perspective view of the lower stage of the hybrid aerial vehicle of FIG. 1.

FIG. 3. is a cutaway view of the gondola of the hybrid aerial vehicle of FIG. 1.

DETAILED DESCRIPTION OF THE PREFERRED EMBODIMENT(S)

Figure 4:
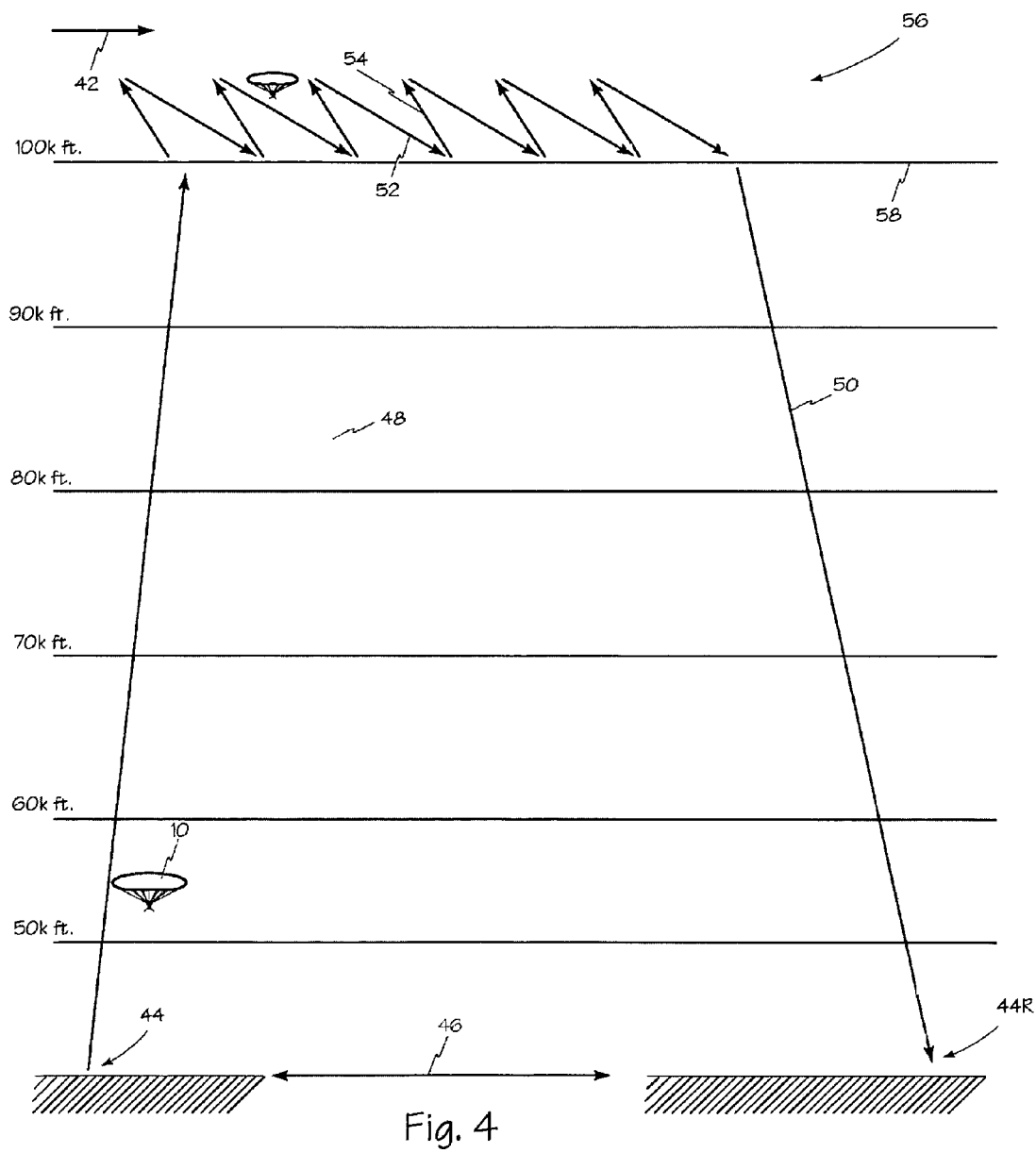
FIG. 4. is a diagram of an example flight profile of a hybrid aerial vehicle according to the present disclosure.

Referring now to FIG. 1, a hybrid aerial vehicle 10 according to the present disclosure includes primary envelope 12 supporting lower stage 11. Primary envelope 12 may adopt any suitable shape, such as ellipsoidal, to provide aerodynamic lift, an optimal ratio of lift to drag, coupled with low-density lift from the contents of primary envelope 12. The contents of primary envelope 12 may be any suitable lighter-than-air gas. Primary envelope 12 may be formed of translucent material to allow solar energy collection when primary envelope 12 is between the sun and gondola 14. Primary envelope 12 may also include one or more internal baffles or partitions 15 to provide sufficient rigidity to maintain the desired shape of the primary envelope while supporting lower stage 11 in flight.

Referring now to FIG. 2 and FIG. 3, lower stage 11 may include suspension equipment 17 and gondola 14. Gondola 14 supports all vehicle subsystems and payloads. Suspension equipment 17 may include support wires or cables 17A, spoked wheel 17B and rotator shaft 28. Suspension wires 17A connect envelope 12 to a composite wheel and spoke structure 17B.

Suspension equipment 17 and specifically rotator shaft 28 and rotation mechanism 32R and translation drive mechanism 32T enable CG pitch and yaw control of hybrid aerial vehicle 10. Specifically, the pitch of the hybrid aerial vehicle may be controlled by translating gondola 14 and thus the center of mass 35 of gondola 14, forward and aft, relative to rotator shaft 28, along axis 30, using any suitable mechanism such as a worm drive mechanism.

Rotator shaft 28 may also mechanically rotate gondola 14 360° relative to primary envelope 12 along path 33 by aligning gondola 14 and propulsion system 35 with the desired direction of flight. Rotation and translation of gondola 14 may be operated simultaneously or individually.

Propulsion may be provided by one or more motors such as motors 22 and 22A may provide propulsive force 26 or 26A using any suitable technique such as propellers 24 and 24A. Where two motors are included they may be aligned in opposition along gondola axis 30. Propellers 22 and 22A may be configured to operate simultaneously or individually and to cause the propellers to rotate in the same or different directions. The applied direction of propulsive force may be controlled using rotator 32R under the direction of controller 34 by rotating gondola 14 about support 28. The use of a precision recovery system may enable recovery of the lower stage and associated payload.

Hybrid aerial vehicle 10 may also include one or more payload boxes such as box 36 located on the bottom of the gondola to house mission specific equipment such as ISR sensor 38 and any other suitable equipment.

Solar wings 21 and 23 extend down from the top of gondola 14 and support one or more solar panels such as solar panels 16. Solar wings 21 and 23 are angled to avoid interference with payloads. The combination of solar wings 21, 23 and skids 21S and 23S support and protect the gondola, propellers, and payloads during assembly, launch, and recovery.

Electrical equipment of hybrid aerial vehicle 10 may be powered by solar energy captured by one or more solar collectors 16 on solar wings 21 and 23. Solar collection may also be optimized to capture sunlight from the rising and setting sun using one or more mirrors 21M and 23M that may be dynamically oriented to track the sun during the course of the day and reflect the sunlight onto the lower solar wings 21 and 23 respectively. Power from solar collectors 16 may be stored in one or more energy storage devices 20. Electrical energy stored in energy storage device 20 may power propulsion motors 22 and 22A, as well as other devices.

Referring now to FIG. 4, hybrid aerial vehicle 10 may use a flight profile such as flight profile 56 to loiter over area 46. Launching from remote base 44, hybrid aerial vehicle 10 ascends along flight path 48 to any suitable altitude. A flight profile may be selected to allow for wind direction 42. Upon reaching altitude 58, hybrid aerial vehicle 10 may perform one or more series of climb maneuvers such as climb 54 and descent maneuvers such as descent 52 to maintain position over area 46. When desired, hybrid aerial vehicle 10 may descend in a controlled fashion to area 44 from which it was launched or any other suitable location such as recovery area 44R.

Those skilled in this art will understand how to make changes and modifications to the present disclosure to meet their specific requirements or conditions. Such changes and modifications may be made without departing from the scope and spirit of the disclosure as set forth in the following claims.

What is claimed is:

1. An aerial vehicle comprising:
an aerodynamic envelope enclosing a volume of lifting gas;
suspension lines engaging the aerodynamic envelope;
a rotor suspended from the aerodynamic envelope by the suspension lines; and
a gondola including a positional translator for translating the gondola with respect to the aerodynamic envelope, the positional translator engaging the rotor, wherein the gondola is suspended below the envelope by the rotor, and the gondola is able to rotate and translate with respect to the aerodynamic envelope.

2. The aerial vehicle of claim 1, further comprising one or more solar energy collectors.

3. The aerial vehicle of claim 2, wherein the solar collectors comprise solar wings with one or more solar panels that are angled so as to avoid interference with payloads.

4. The aerial vehicle of claim 3, wherein the solar wings carry the gondola, propellers, and payloads during assembly, launch, and recovery operations.

5. The aerial vehicle of claim 2, wherein the aerodynamic envelope is made of a translucent material.

6. The aerial vehicle of claim 1, wherein the aerodynamic envelope is shaped to provide aerodynamic lift.

7. The aerial vehicle of claim 1, further comprising a rotation mechanism connecting the rotor shaft to the gondola to rotate the gondola relative to the aerodynamic envelope.

8. The aerial vehicle of claim 1, wherein the gondola further comprises one or more payload boxes to house one or more payloads.

9. The aerial vehicle of claim 8, further comprising one or more Intelligence, Surveillance, and Reconnaissance sensors associated with the payload boxes.

10. The aerial vehicle of claim 1, further comprising a propulsion system, wherein the propulsion system includes one or more propellers, the one or more propellers having one or more blades.

11. The aerial vehicle of claim 1, wherein the positional translator comprises a worm drive.

12. The aerial vehicle of claim 1, wherein the rotor comprises a wheel and a rotator shaft, wherein the wheel engages the rotator shaft.

13. The aerial vehicle of claim 12, wherein the spoked wheel engages the suspension lines.

14. The aerial vehicle of claim 1, wherein the aerodynamic envelope comprises a single chamber balloon.

15. The aerial vehicle of claim 1, wherein the aerodynamic envelope comprises one or more internal baffles.

16. The aerial vehicle of claim 1, wherein the aerodynamic envelope comprises a low aspect ratio shape.

17. The aerial vehicle of claim 16, wherein the aerodynamic envelope comprises an ellipsoidal shape.

18. The aerial vehicle of claim 1, wherein all propulsion, power, directional control, and payload equipment is located on the gondola.

19. The aerial vehicle of claim 2, wherein the solar collectors comprise one or more mirrors to reflect sunlight onto the solar collectors.

20. The aerial vehicle of claim 19, wherein the one or more mirrors are dynamically oriented to track the sun so as to reflect sunlight onto the solar collectors.

21. The aerial vehicle of claim 1, further comprising a reserve supply of lifting gas that is separate from the volume of lifting gas of the aerodynamic envelope.

22. The aerial vehicle of claim 1, further comprising an automatic gas vent control for venting the lifting gas from the aerodynamic envelope.

23. The aerial vehicle of claim 10, wherein the propulsion system is disposed on the gondola and wherein the rotor enables the propulsion system to be aligned with a desired direction of travel of the aerial vehicle.

24. The aerial vehicle of claim 10, wherein the propulsion system further includes one or more electric motors engaged with at least one of the one or more propellers.

25. The aerial vehicle of claim 24, wherein the one or more electric motors are powered by at least one of a battery and a solar cell.

26. The aerial vehicle of claim 24, wherein the propulsion system includes at least two electric motors aligned in opposition along an axis of the gondola.

27. The aerial vehicle of claim 24, wherein the propulsion system includes two electric motors, each electric motor engaging one propeller, and wherein the electric motors cause one of the propellers to rotate in a direction opposite to the other when the propellers apply a propulsive force in the same direction.

28. A method of deploying remote sensors above a selected altitude, the method comprising:
providing an aerial vehicle comprising:
an aerodynamic envelope enclosing one or more volumes of lighter than air gas;
suspension lines engaging the aerodynamic envelope; and
a gondola, the gondola being suspended from the aerodynamic envelope by the suspension lines, and the gondola including a propulsion system for horizontal control;
controlling the rotational orientation of the gondola with respect to the aerodynamic envelope; and
controlling a pitch of the aerial vehicle by controlling a position of a center of mass of the gondola to shift the weight of the gondola relative to the aerodynamic envelope.

29. The method of claim 28, wherein the selected altitude is above about 100,000 feet mean sea level.

30. The method of claim 28, wherein the controlling the rotational orientation of the gondola with respect to the aerodynamic envelope substantially aligns the gondola with a prevailing wind.

31. The method of claim 30, further comprising the propulsion system propelling the aerial vehicle into the prevailing wind.

32. The method of claim 31, further comprising:
increasing the pitch of the aerial vehicle during at least a portion of a duration of a first prevailing wind speed to so that the altitude of the aerial vehicle increases; and
decreasing the pitch of the aerial vehicle during at least a portion of a duration of a second prevailing wind speed so that the altitude of the aerial vehicle decreases, wherein the first prevailing wind speed is greater than the second prevailing wind speed.

33. A method comprising:
providing an aerial vehicle, the aerial vehicle comprising:
an aerodynamic envelope enclosing a volume of lifting gas;
suspension lines engaging the aerodynamic envelope;
a rotor suspended from the aerodynamic envelope by the suspension lines;

a gondola including a positional translator for translating the gondola with respect to the aerodynamic envelope, the positional translator engaging the rotor, wherein the gondola is suspended from the aerodynamic envelope by the rotor, and the gondola is able to rotate and translate with respect to the aerodynamic envelope; and a propulsion system disposed on the gondola, wherein the propulsion system is aligned with an axis of the gondola to produce thrust along the axis;

controlling the rotational orientation of the gondola with respect to the aerodynamic envelope to align the axis of the gondola with a prevailing wind;

generating thrust from the propulsion system to propel the aerial vehicle into the prevailing wind; and controlling a position of the center of mass of the gondola along the axis of the gondola with respect to the aerodynamic envelope to increase a pitch of the aerial vehicle to cause the aerial vehicle to climb beyond an altitude at which the aerial vehicle is neutrally buoyant.

34. The method of claim 33, further comprising:
controlling a position of the center of mass of the gondola along the axis of the gondola with respect to the aerodynamic envelope to decrease the pitch of the aerial vehicle to cause the aerial vehicle to descend at a speed greater than a speed of the prevailing wind.

35. The method of claim 34, further comprising:
alternatingly increasing and decreasing the pitch of the aerial vehicle by controlling the position of the center of mass of the gondola along the axis of the gondola with respect to the aerodynamic envelope to maintain a station-keeping profile over a predetermined geographic area.

36. The method of claim 35, wherein the increased pitch is maintained during at least a portion of time when a speed of the prevailing wind is above a first speed and the decreased pitch is maintained during at least a portion of time when a speed of the prevailing wind is below a second speed.

37. The method of claim 33, wherein the altitude at which the aerial vehicle is neutrally buoyant is above about 100,000 feet mean sea level.

38. An aerial vehicle comprising:
an aerodynamic envelope enclosing a volume of lifting gas;
a lower stage including:
suspension lines engaging the aerodynamic envelope;
a rotor suspended from the aerodynamic envelope by the suspension lines; and
a gondola suspended from the aerodynamic envelope and including a positional translator for translating the gondola with respect to the aerodynamic envelope, wherein the rotor enables the gondola to rotate with respect to the aerodynamic envelope and the positional translator enables the gondola to translate with respect to the aerodynamic envelope.

* * * * *